United States Patent [19]
Cohee et al.

[11] Patent Number: 5,874,151
[45] Date of Patent: Feb. 23, 1999

[54] RIGIDIFIABLE PLASTIC COMPOSITES AND MANUFACTURING METHODS THEREFOR

[75] Inventors: Donald R. Cohee, Felton; Edgar G. Ashmead, Lewes, both of Del.

[73] Assignee: ILC Dover, Inc., Frederica, Del.

[21] Appl. No.: 832,157

[22] Filed: Apr. 2, 1997

Related U.S. Application Data

[62] Division of Ser. No. 459,670, Jun. 2, 1995, Pat. No. 5,651,848.

[51] Int. Cl.$^6$ ....................................................... B32B 3/06
[52] U.S. Cl. .......................... 428/102; 428/174; 156/93; 264/31; 264/36; 264/152; 264/259; 264/267; 264/269
[58] Field of Search ................................... 428/102, 174; 156/93; 264/31, 36, 152, 259, 267, 269

[56] References Cited

U.S. PATENT DOCUMENTS

| | | |
|---|---|---|
| 3,779,847 | 12/1973 | Turner . |
| 4,109,435 | 8/1978 | Loyd . |
| 4,206,895 | 6/1980 | Olez . |
| 4,250,702 | 2/1981 | Gundlach . |
| 4,299,871 | 11/1981 | Forsch . |
| 4,331,495 | 5/1982 | Lackman et al. . |
| 4,393,116 | 7/1983 | Taylor . |
| 4,410,577 | 10/1983 | Palmer et al. . |
| 4,530,868 | 7/1985 | Shinmi et al. . |
| 4,664,961 | 5/1987 | Vees et al. . |
| 4,786,343 | 11/1988 | Hertzberg . |
| 4,876,973 | 10/1989 | Marrache et al. . |
| 4,913,937 | 4/1990 | Engdahl et al. . |
| 5,055,242 | 10/1991 | Vane . |
| 5,071,506 | 12/1991 | Nelson et al. . |

*Primary Examiner*—Christopher Raimund
*Attorney, Agent, or Firm*—Watson Cole Stevens Davis, P.L.L.C.

[57] ABSTRACT

Rigidifiable composites are formed by stitching a reinforced B-stage resin sheet stock to form a three-dimensional preform. The preform is subsequently rigidified by initiating final cure of the resin. Molded articles, inflatable and other structures, such as, tank, tunnel and sewer liners are some of the typical structures which can be formed by the methods of the invention. Control of thread count, thread tension and thread spacing can be used to consolidate multi-ply or layered preforms, which, upon cure, can have up to 90% of the load carrying capacity of compression molded fiber reinforced articles.

9 Claims, 4 Drawing Sheets

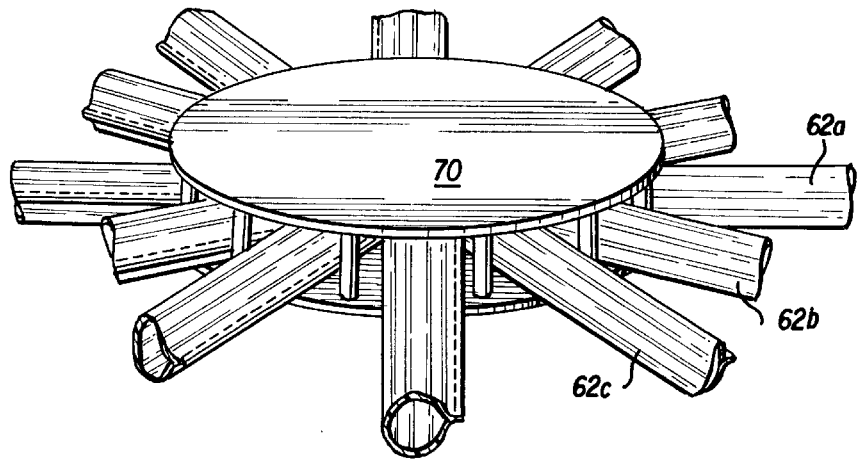
FIG. 7
FIG. 8
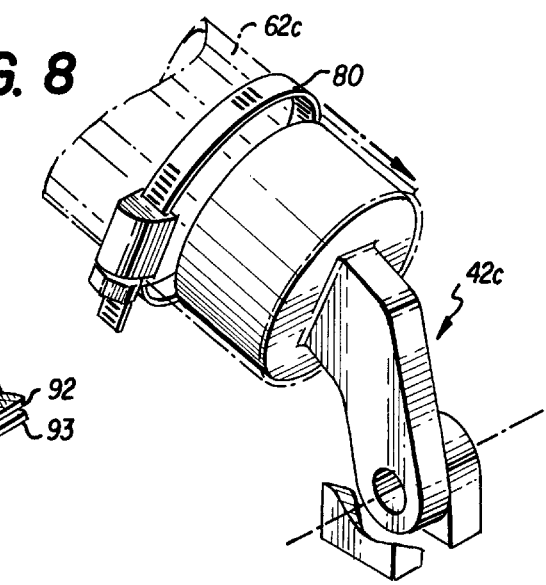
FIG. 9
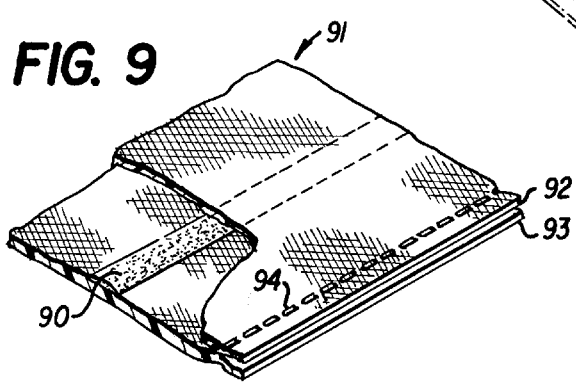
FIG. 10
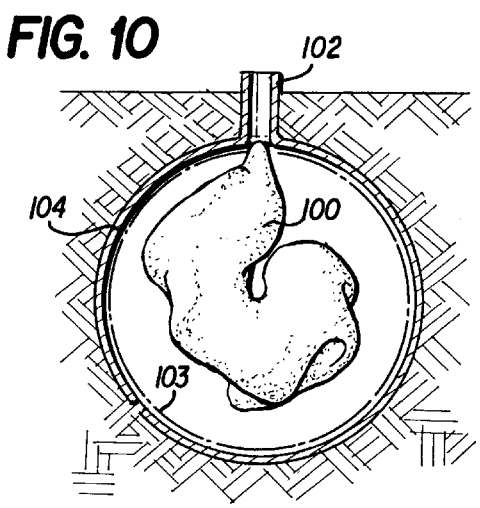
FIG. 11
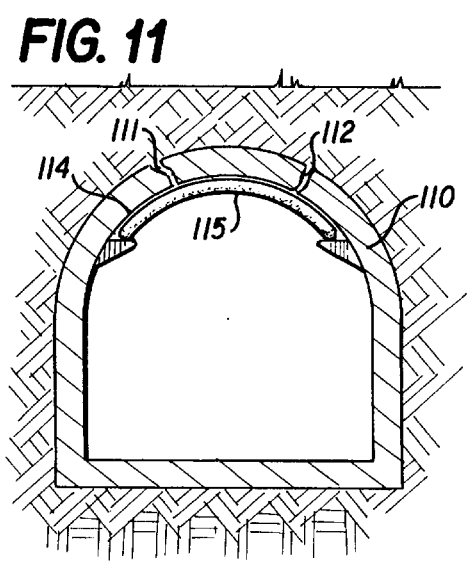

RIGIDIZATION TEST RESULTS ROUND 1
5 PLY QUASI ISOTROPIC LAYUP 7781 GLASS/TOUGHENED EPOXY

| CONSOLI-DATION | TENSILE TEST DATA ||||||
|---|---|---|---|---|---|---|
| | LBS || STRESS || MODULUS ||
| | LOAD | % LOAD | KSI | %STRESS | MSI | % MOD |
| PRESS | 3249 | 100 | 81.7 | 100 | 0.54 | 100 |
| VACUUM | 2677 | 82 | 44.9 | 55 | 0.33 | 61 |
| STITCH 1 | 3030 | 93 | 47.8 | 59 | 0.3 | 56 |
| STITCH 2 | 2358 | 73 | 37.4 | 46 | 0.29 | 54 |
| STITCH 3 | 2359 | 73 | 36.5 | 45 | 0.28 | 52 |

| CONSOLI-DATION | COMPRESSION TEST DATA ||||||
|---|---|---|---|---|---|---|
| | LBS || STRESS || MODULUS ||
| | LOAD | % LOAD | KSI | %STRESS | MSI | % MOD |
| PRESS | 1641 | 100 | 72.9 | 100 | 0.73 | 100 |
| VACUUM | 1357 | 83 | 42.1 | 58 | 0.25 | 34 |
| STITCH 1 | 1511 | 92 | 38.5 | 53 | 0.38 | 52 |
| STITCH 2 | 1378 | 84 | 34.6 | 47 | 0.59 | 81 |
| STITCH 3 | 1440 | 88 | 36.9 | 51 | 0.39 | 53 |

STITCH 1 = 11 TPI, 1/8" SPACING, MEDIUM TENSION
STITCH 2 = 6 TPI, 1/4" SPACING, MEDIUM TENSION
STITCH 3 = 3 TPI, 1/2" SPACING, MEDIUM TENSION

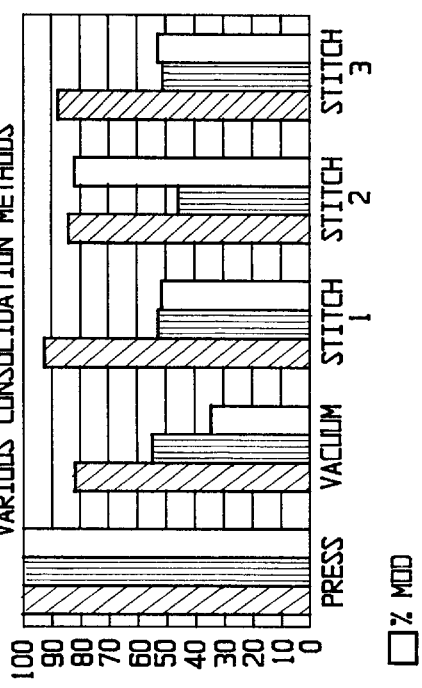
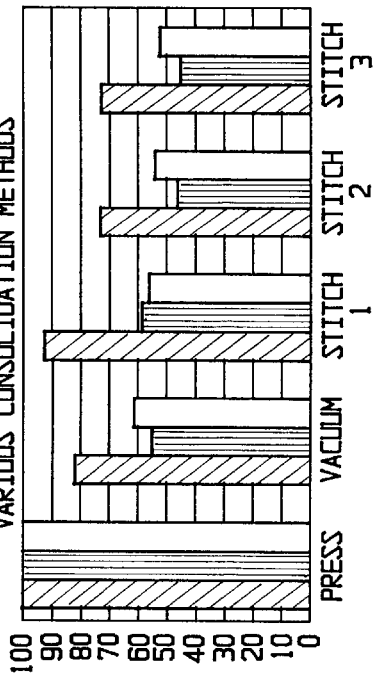

FIG. 12

RIGIDIFIABLE PLASTIC COMPOSITES AND MANUFACTURING METHODS THEREFOR

This is a division of application Ser. No. 08/459,670 filed Jun. 2, 1995, now U.S. Pat. No. 5,651,848.

BACKGROUND OF THE INVENTION

1. Field of the Invention

The present invention is directed to forming rigid three-dimensional articles from a precursor, planar, source of fiber-reinforced resin matrix by use of stitching and sewing techniques to connect the planar source sheet into an intermediate three-dimensional preform. The source material is preferably in a B-stage state of cure during the stitching and sewing operation and is subsequently rigidified by physical and/or chemical stimuli.

2. Background of the Invention

Composite structures of a fiber-reinforced, polymeric matrix, have found utility for various structural articles.

One such method of manufacturing comprises impregnating woven fabric with a curable resin in liquid form and "laying-up" said "wet" material onto a mold or core. The wet laid-up material can be cured by applied heat and pressure, typically a slow autoclave process. Alternatively, continuous filaments or fibers can be "chopped" and fed into the path of a projected stream or spray of liquid resin which coats the chopped filaments or fibers while simultaneously entraining and conveying the chopped fibers or filaments onto a mold surface. Such chopped filaments techniques are not suitable for articles requiring uniformly distributed or oriented reinforcement.

Still other manufacturing methods lay-up a dry fabric onto a core, temporarily attaching the fabric to the core by an adhesive or cement applied to the periphery of the fabric pieces. For complex three dimensional shapes, the laying-up of dry fabric pieces on a core and temporarily gluing the edges of the pieces is a time-consuming procedure requiring the use of skilled labor to position and attach the fabric pieces to the core. After the dry fabric pieces are completely laid-up, the core is placed in a mold and a liquid resin is introduced into the cavity between core and mold so as to coat the fabric, flowing through the interstices of the fabric. However, if the liquid resin is introduced into such cavities under pressure, the introduction of the liquid resin may disrupt or dislodge the laid-up dry fabric temporarily adhered to the core causing imperfections, such as over-lapped fabric or voids in the fabric reinforcement resulting in an imperfect product or a reject. Once the impregnating resin is cured, recycling of the rejects is impracticable resulting in a loss of both labor and materials.

Thus, there exists a continuing need to provide a simple, economical method of manufacturing three-dimensional shaped composite articles which do not require skilled labor to lay-up individual fabric pieces (whether impregnated with resin or dry fabric).

Additionally, there continues to be a need for a manufacturing method of fabricating three-dimensional shapes at one location, i.e., a factory, but delaying onset of rigidification of such articles until they are placed in situ, i.e., at the site of ultimate use.

Up until the present invention there still existed a need for forming structural units, such as buildings, or components thereof, produced from reinforced resin-composites in an inexpensive manner, which are low in cost not only in the manufacturing thereof but also in the transportation and erection thereof, on site.

Achievement of the foregoing and other objects will become apparent to those of ordinary skill in the art from reading this disclosure.

SUMMARY OF THE INVENTION

The invention provides new fabrication techniques to produce three-dimensional shapes which do not require the labor intensive lay-up techniques of the prior art.

In one aspect complex three-dimensional shaped preforms can be expeditiously formed for molding into a final shape. In a modification of such aspect the three-dimensional shapes can be readily transported to a site of ultimate use and then erected and rigidized.

In carrying out these and other aspects of the invention use is made of a pre-impregnated woven, non-woven, or knitted fabric or felt or other precursor material for forming a fiber reinforced resin matrix (hereinafter collectively termed "prepreg").

This prepreg material is conventionally formed of reinforcing fibers which have been coated or impregnated with a polymeric material having an intermediate curing stage, conventionally known to the industry as "B-stage cure."

The reinforcing fibers, in the form of a woven, non-woven, knitted or felt sheet can be coated or impregnated with the resin in any conventional fashion, such as by spraying, dipping, doctor-blading, roll-coating or other conventional manner of applying the desired loading of polymer on the fabric. After loading the fabric, the polymer is polymerized to a non-sticky, tack-free or "leather-like" cured state but not to its final or rigid cure stage. Such intermediate or B-stage curing resins are well known in the industry and may comprise polyesters, polyimides, epoxy and other polymers. Examples of such resins, as well as the processing of such resins to ultimate cure are found in the following documents: U.S. Pat. Nos. 4,410,577; and 4,331,495, the disclosures of which are incorporated in their entireties by reference.

Such resin may contain fillers (other than the reinforcing fibers) to impart other desirable physical properties, or merely to diminish the volume of the polymeric material. The overall properties of the composite can be adjusted to suit any particular application through various combinations of fiber type, size, and form (i.e., woven, knitted, non-woven, felt) resin loading, filled or non-filled resin, multi-layer (same or dissimilar properties), or single layer composites, etc.

Examples of suitable reinforcing fibers include inorganic and organic fibers, such as carbon and/or graphite, glass, polyester, including polyethylene terephthalate, poly (paraphenyl terephthalamide) including those sold under the registered trademark "KEVLAR", ceramic fibers including both metal oxide and non-metal oxide types such as alumina and silica nitride, respectively, and others chosen to provide the desired physical and/or chemical properties.

Because many of these fibers are brittle and/or non-extensible, they cannot be bent or stretched about a complex three-dimensional core or erected into other three-dimensional shaped forms from an as-impregnated planar sheet.

The present inventors have found it possible to utilize ordinary sheet goods or rolls of B-stage cured resin-impregnated fiber reinforced materials in the manufacture of complex molded three-dimensional shapes and erected structural members.

BRIEF DESCRIPTION OF THE DRAWINGS

FIG. 7 is a schematic, partially cross-sectional view of the "spokes" of FIGS. 4–5 in engagement with the "hub" enlarged to show detail.

FIG. 8 is a schematic view of an enlarged portion of the anchorage of the "hub and spoke" arrangement of FIGS. 4–5.

FIG. 9 is a partially cut away view of a portion of the drape material of FIG. 5 illustrating the stitched multi-layered construction and the resistance heating element.

FIG. 10 shows an embodiment of using the invention to line underground storage tanks;

FIG. 11 shows an embodiment of the invention to repair damaged or cracked underground sewers or tunnels; and FIG. 12 is a graphic representation of the effect of stitch consolidation on 5 ply quasi-isotropic layers of a glass toughened epoxy resin in comparison to vacuum and compressionmolded articles.

DETAILED DESCRIPTION OF THE INVENTION

Figure 1:
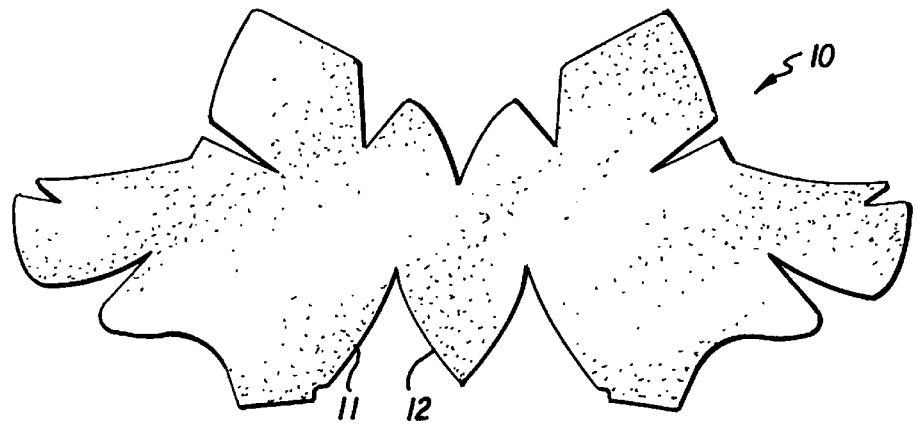
FIG. 1 illustrates a portion of a roll of B-stage cured resin impregnated fabric which has been cut according to a pattern into a piece for ultimately forming a composite helmet.
Figure 3:
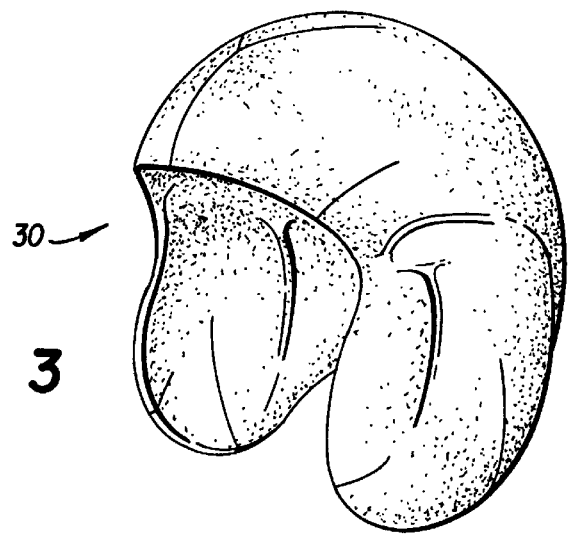
FIG. 3 shows the three-dimensional structure of FIG. 2 molded and rigidified into a helmet.

A planar sheet of B-stage resin impregnated fiber reinforced sheet cut from patterned layers (hereinafter "prepreg") 10 of FIG. 1 is formed into a precursor of a three-dimensional shape (helmet) 30 as shown in FIG. 3. The B-state cure resin of the sheet is in a tack-free state permitting the sheet to be handled without sticking to itself or other similar sheets. The "tackiness", boardiness, drape, and flow and molding properties of the prepreg 10 are controlled by manipulation of the type of resin, amount and type of filler (other than the reinforcement) the type, thread count and size of reinforcing fiber, etc. depending on the desired parameters of the product or processing equipment and can be modified by those skilled in the art upon reading this disclosure. Thus, the leathery state of the B-stage cured resin sheet permits it to be cut from a source of goods, such as a roll of such resin impregnated sheet by customary cutting techniques. Cutting may employ any of the known manual or automated fabric cutting techniques, such as by the use of a pattern and scissors; a knife blade or even computer-controlled ultrasonic knife cutting techniques which can cut multiple layers of fabric simultaneously.

Figure 2:
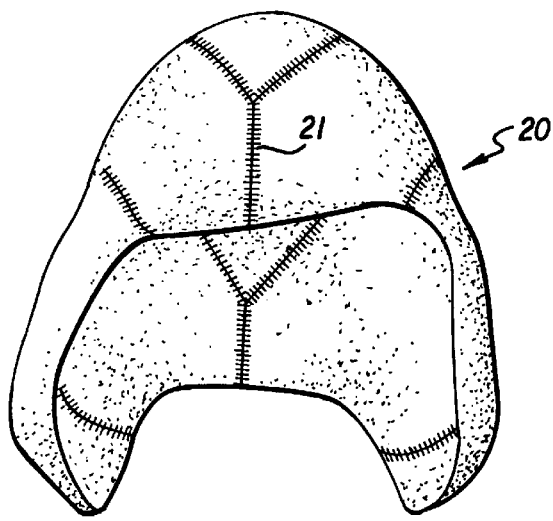
FIG. 2 shows the stitching of adjacent edges of the piece of FIG. 1 into a three-dimensional preform structure.

Once cut the individual layers of resin-impregnated fabric can then be stitched along adjacent edges 11, 12 into a freestanding three-dimensional preform 20 as shown in FIG. 2. The stitching 21 (enlarged in FIG. 2 to show detail) can be effected using standard broadgoods sewing techniques to produce a preform 20 which can be handled, holds its shape within a specified tolerance and may be stored or immediately loaded onto a tool (e.g., an inflatable core or bladder) for insertion into a compression mold and rigidified by heat and pressure into a final laminate of complex three-dimensional shape (helmet) 30 as in FIG. 3. The resin composition can be regulated through suitable loading with fillers (other than the reinforcing fiber) to facilitate flow of the resin and filling of all interstices or voids in or near the stitching 21 and throughout the fiber reinforcing in a rapid compression molding process. This technique saves time and cost over the traditional ply-by-ply lay-up, intermediate debulk process and molding cycle. The handleability and manageability of the cut prepreg 10 and the preforms 20 are greatly enhanced by this new technique.

Although the helmet 30 has been given as exemplary of a complex, three-dimensional shape, it is one of the simplest such shapes by which to explain the invention. Much more complex shapes, such as a module which rests upon and is attached to the helmet 30 can also be manufactured by the invention. Such complex shapes, and others, may require the use of multiple pieces of resin impregnated B-stage cured fiber reinforced sheet of differing properties, i.e., differing type, size, or layout of reinforcing fiber, placement of embedded materials such as fasteners, sockets or other attachment means for electronic controls to ultimately be placed in the helmet modules. Such features can be accommodated by the present invention. For example, layers of prepregs of different properties, e.g., type of fibers, can be tacked together, prior to stitching, so as to connect the layers at predetermined locations, which still permit some relative layer to layer movement so as to permit the individual layers to be stitched together to form the preformed three-dimensional shape. Quality control is also simplified in that the respective plies of a multi-layer preform can easily be accounted for at the edge of the part where stitched, that is, the layers are not glued together at their edges as in a conventional lay-up process as previously described.

The use of conventional stitching techniques, including manual and machine sewing are within the scope of the invention. High speed, complex geometry sewing and stitching machinery can be utilized in performing the necessary sewing and/or stitching.

Although we have described the process for forming a helmet 30 from a single piece of planar sheet or roll stock, in some cases it may be necessary to form the preformed three-dimensional shape by stitching together more than one cut stock material. This is especially true if different areas of the component are required to possess different physical and/or chemical properties. In such a case, a multi-patterned stock material cut from two or more sources of prepreg may be stitched into the final three-dimensional shape. In addition to the helmet shell and module previously mentioned, the invention can also be utilized to make other three-dimensional articles from planar sheet stock such as compression molded structural automotive chassis cross members, aircraft drop tanks, radar/satellite dishes, industrial valve covers, a float, such as for factory fishing operations, buoys, three-dimensional decoys, conformed supports, such as shoe soles, lumbar supports, or bicycle seats, braces, casts, or splints; low storage volume containers, boat hulls, life rafts, aircraft components, especially for ultra-lights and hang-gliders; bulletproof vests and other protective clothing, as well as replacements for other articles currently manufactured by the prior art techniques described above or suggested in view of the disclosure of the instant invention.

With the application of appropriate thread tension and stitch spacing, it is possible to supply adequate pressure to a three-dimensional preform to ensure consolidation without the need for additional induced pressure. This is assisted by control of resin viscosity to assure specific resin flow to fill voids and interstices in the stitched fabric area.

For example, a five layer laminate of a glass toughened epoxy resin matrix was stitch consolidated at three levels of induced consolidation pressure and compared to 100 psi (pounds per square inch) and 14 psi press and vacuum bag consolidation processes. The results are graphically depicted in FIG. 12.

The results show that the 11 TPI (threads per inch) ⅛" spaced, medium tension stitched panel performed favorably as compared to the vacuum consolidated panel and had close to 90%, of the load value of the press consolidated panel.

Such stitching techniques allow the fabrication of composite structures without the typical costs of capital equipment and energy to consolidate the laminate.

Optimization of the thread size, count, spacing, material and tension for any particular material system would be a matter of routing experimentation for those skilled in the art based upon the disclosure of the invention.

Although we have discussed the fabrication of parts from the stitching of prepregs to form preforms suitable for use in molding articles, the invention has application where the fabrication of a mold would be unduly cumbersome and/or expensive.

For example, the invention finds utility in fabricating large articles, such as aircraft hangars, in-ground and above-ground swimming pools, chemical storage buildings, grain silos, basement for houses, semi-permanent shelters, including cable suspended dome shelters, geodesic domes, pyramids and other covers or shelters including inflatable habitats, and awnings, underground or above-ground storage tanks, settling ponds, tunnel liners, and similar articles by providing a method of forming these articles without the use of a compression mold.

Figure 4:
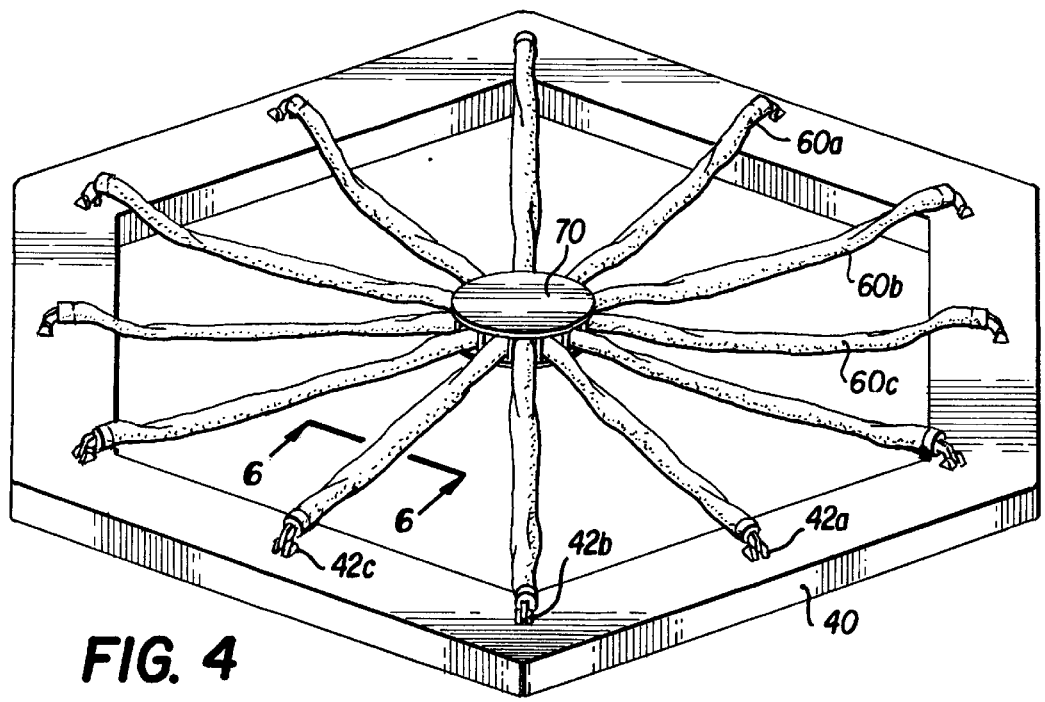
FIG. 4 is a schematic, perspective view of an inflatable "spoke and hub" structure formed from B-state impregnated fabric according to the invention.
Figure 6:
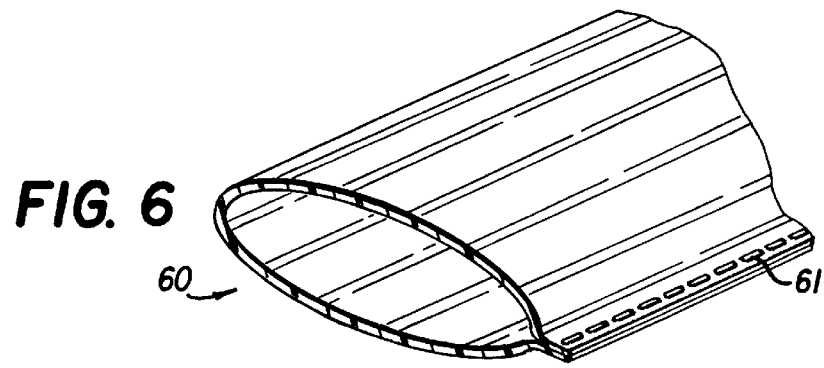
FIG. 6 is a partial cross-sectional view of a portion of a spoke along line 6—6 as shown in FIG. 4 enlarged to show detail

One such way to form prepregs into supporting structures is by sewing 61 the prepreg into the form of a closed tube 60 in FIG. 6 having means (such as metallic end fittings) (not shown) to introduce gas pressure, (such as air pressure) into the respective tubes. If a plurality of such tubes 60a, 60b, 60c, etc. were arranged into a structural unit, such as spokes 62a, 62b, 62c, etc. radiating from a central hub 70 as in FIGS. 4, 5, 7, upon inflation (FIG. 5) they could be used to lift themselves and the hub 70 (including any payload on the hub, such as a drape 52 of prepreg material) into position. Preferably the ends of the spokes 62a, 62b, 62c, etc. opposite the hub 70 are supported or even anchored by anchorages 42a, 42b, 42c, etc. to a load bearing foundation 40. Once rigidified the spokes 60a, 60b, 60c, etc. and hub 70 act as the weight supporting structure for the drape 52 forming a shelter or roof even after the gas pressure in the respective spokes 60a, 60b, etc. is discontinued. The drape 52 can also be rigidified through a similar or different mechanism of rigidification. The ends of identical tubes, such as tube 62c (FIG. 8) are clamped by clamping elements 80 to their respective anchorages 42c.

Although we have heretofore discussed the employment of heat and/or pressure to bring the preform from B-stage to total cure, it should be noted that other curing systems could be used to cure the B-stage resin used in the invention.

Figure 5:
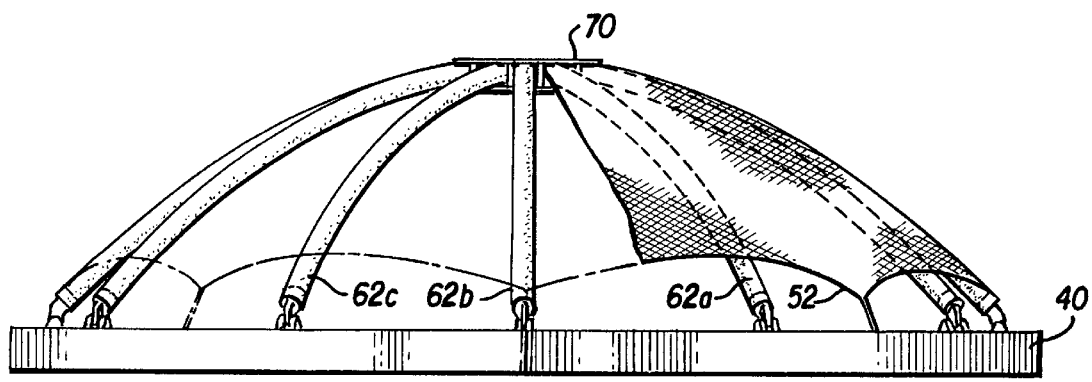
FIG. 5 shows the "spoke and hub" structure of FIG. 4 in a schematic front view erected by inflation and cured into rigid form capable of supporting a drape or roof structure of composite material according to the invention.

For example, the drape 52 referred to in connection with FIG. 5 may contain an infrared (IR) or ultraviolet (UV) containing catalyst or initiator, in which case, exposure to a source of such radiation, including the Sun, will begin the rigidification process. Meanwhile, the supporting structure of spokes 60a, 60b, etc., possibly shielded by the drape 52 from the source of radiation may be rigidified through the use of a gaseous catalyst introduced with the inflation gas. Alternatively, small electrical resistance heating elements 90 (FIG. 9) may be incorporated into the prepreg materials 91 (or embedded between adjoining layers 92, 93 or plies of the materials), in either, or both, of the spokes 60a, 60b, etc. or drape 52, which upon connection to a source of electricity, will generate sufficient heat to cure the preforms. The stitching 94 of FIG. 9 illustrates the advantage for quality control to easily identify the presence of separate layers 92, 93 or plies in a layered structure.

It is to be understood that one or more of these rigidifying techniques can be combined in a single prepreg to initiate final cure of the resin component.

As a variant of the use of inflation pressure in a supporting structure, the prepreg itself may be converted into a three-dimensional structure by creating a confined, but inflatable cavity in the preform. Such cavity can then be expanded by suitable gas/liquid pressure and then rigidized. Application of this technique would permit the placement of a folded preform 100 through the neck 102 of an underground tank 104, which preform 100 could then be inflated to expand it into conformity with the interior wall 103 of the tank 104. Upon rigidification, the cured preform 100 will act as a tank liner; See FIG. 10.

Although mentioned in connection with an underground tank, it is apparent from this disclosure that other structures can be lined, such as wells, pipes or pressure vessels, liners for ships and trucks, emergency pressure walls for aircraft and underwater environments, mine shaft supports, geoliners and tunnel liners, and other such uses.

However, it is not necessary that the inflatable preforms of the invention require a support, such as the wall of a cavity to be lined, but may be free standing.

For example, utilizing the techniques described herein, prepregs can be stitched into preforms of the desired shape and folded up for transport to the sites of intended use. Upon inflation, and exposure to a suitable curing initiation, UV or IR radiation, gaseous catalyst, resistive heating, etc., the preform will be rigidized. Thus, fiber-reinforced, polymeric, telephone poles or traffic light supports can be easily transported in roll or folded-up form and inflated and rigidified at the point of use. Similarly, inflatable bridges, lifeboats, signage, emergency or disaster shelters or chemical tank covers can be stored or transported in compact form and rigidified when needed.

However, the invention may also be employed whenever convenience is desired. As shown in FIG. 11 wherein 110 represents an underground sewer or tunnel having defects, e.g., cracks 111, 112, in its structure, a preformed panel 114 may be carried into the sewer in rolled-up form and merely unrolled, positioned and held in place by an inflatable beam 115, and rigidified to form an instant liner/form to repair the defect in the sewer. It will be clear to those skilled in the art that once the preformed panel 114 is rigidified, it may be temporarily used as a form into which a repair substance is injected, e.g., concrete or organic resin containing repair materials or may be suitably affixed or adhered to the structure as a permanent liner through the use of conventional means such as bolting, gluing or otherwise affixing the rigidized preform 114 to the sewer or tunnel 110 to be repaired. In either event, it is more easily transported and utilized for its intended purposes than a prefabricated, rigidized form or liner heretofore known.

Although we have discussed the use of inflation cavities in the preforms themselves, it is also within the scope of the invention to use inflatable forms or bladders, cables, scaffolding or other means to assist in erection of the B-stage preforms before rigidification.

Having fully described our invention, it will be apparent to those skilled in the art to which our invention pertains that many modifications, optimizations and variations of the invention can be made without departing from the scope of the appended claims.

We claim:

1. A three-dimensional product formed by a process comprising:
   (a) providing a source of B-stage cured fiber-reinforced polymeric material in planar sheet stock form;
   (b) cutting a patterned precursor from said sheet stock;
   (c) stitching or sewing the patterned precursor so as to reshape the B-stage cured planar sheet stock into a three-dimensional preformed shape;
   (d) rigidifying said preform by initiating final cure of said polymeric material.

2. The product of claim 1 wherein the process further comprises placing the preformed shape adjacent to a mold surface prior to rigidifying.

3. The product of claim 1 wherein the process further comprises stitching together two or more components of fiber reinforced polymeric material to form the preformed shape.

4. The product of claim 1 wherein the process further comprises inflating the preformed shape prior to rigidification.

5. The product of claim 4 wherein the preformed shape is inflated into contact with a structure to be lined during rigidification.

6. The product of claim 5 wherein the structure is one selected from the group consisting of storage tanks, sewers and tunnels.

7. The product of claim 1 wherein the preformed shape comprises a series of spokes connected to a hub and the spokes are inflated to lift the hub prior to rigidification of the spokes and wherein the process further comprises supporting a drape of fiber-reinforced polymeric material on the spokes.

8. A method for lining or repairing sewers or tunnels, said method comprising:
   (a) providing in planar form a precursor lining or repairing material of a fiber-reinforced polymeric material in a B-stage cured state;
   (b) decreasing the surface area of the planar precursor material by rolling or folding the planar precursor material;
   (c) transporting the precursor material of step (b) to a site of ultimate use;
   (d) unrolling or unfolding the precursor material of step (b);
   (e) positioning the precursor material by means of an air beam; and
   (f) rigidifying the precursor material.

9. A three dimensional article comprising a roof and supporting structure, at least one of the roof and supporting structure comprising a rigidified preform formed by a process comprising:
   (a) providing a source of B-stage cured fiber-reinforced polymeric material in planar sheet stock form;
   (b) cutting a patterned precursor from said sheet stock;
   (c) stitching or sewing the patterned precursor so as to reshape the B-stage cured planar sheet stock into a three-dimensional preformed shape;
   (d) rigidifying said preform by initiating final cure of said polymeric material.

* * * * *